United States Patent
Brech et al.

(10) Patent No.: US 10,216,544 B2
(45) Date of Patent: Feb. 26, 2019

(54) OUTCOME-BASED SOFTWARE-DEFINED INFRASTRUCTURE

(71) Applicant: International Business Machines Corporation, Armonk, NY (US)

(72) Inventors: Brad L. Brech, Rochester, MN (US); Scott W. Crowder, Pleasantville, NY (US); Hubertus Franke, Cortlandt Manor, NY (US); Jeffrey A. Frey, New Paltz, NY (US); Nagui Halim, Yorktown Heights, NY (US); Matt R. Hogstrom, Raleigh, NC (US); Chung-Sheng Li, Scarsdale, NY (US); David B. Lindquist, Chapel Hill, NC (US); Stefan Pappe, Heidelberg (DE); Pratap C. Pattnaik, Ossining, NY (US); Balachandar Rajaraman, Cary, NC (US); Radha P. Ratnaparkhi, Ridgefield, CT (US); Rodney A. Smith, Atlanta, GA (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/595,977

(22) Filed: May 16, 2017

(65) Prior Publication Data
US 2017/0250891 A1  Aug. 31, 2017

Related U.S. Application Data

(63) Continuation of application No. 14/667,798, filed on Mar. 25, 2015, now Pat. No. 9,729,421.

(51) Int. Cl.
*H04L 12/26* (2006.01)
*G06F 11/26* (2006.01)
(Continued)

(52) U.S. Cl.
CPC ............ *G06F 9/5038* (2013.01); *G06F 9/542* (2013.01); *G06Q 10/0635* (2013.01);
(Continued)

(58) Field of Classification Search
CPC ..................... G06F 11/261; G06F 17/5027
(Continued)

(56) References Cited

U.S. PATENT DOCUMENTS

| 6,718,358 B1 * | 4/2004 | Bigus | G06F 9/5061 706/10 |
| 6,738,736 B1 | 5/2004 | Bond | |

(Continued)

OTHER PUBLICATIONS

"Software Defined Environments"—IBM Journal Research and Development, vol. 58, No. 3, May 2014 https://ieeexplore.ieee.org/stamp/stamp.jsp?arnumber=6798700 (Year: 2014).*

(Continued)

*Primary Examiner* — Randy A Scott
(74) *Attorney, Agent, or Firm* — Stephen R. Yoder

(57) ABSTRACT

A method and system for outcome-based adjustment of a software-defined environment (SDE) that includes establishing a link between a business outcome and a first resource configuration from software defined environment, establishing a monitoring mechanism for continuously measuring a current state of the SDE, using a behavior model of the SDE to anticipate, or forecast, a triggering event, and responsive to the forecast of a triggering event, using the behavior model to determine a second resource configuration to achieve the business outcome. The link includes at least one of a utility of services for the business outcome, a cost of a set of resources consumed by the first resource configuration, and a risk of the set of resources becoming unavailable.

19 Claims, 8 Drawing Sheets

(51) Int. Cl.

| | | |
|---|---|---|
| *G06F 9/50* | (2006.01) | |
| *H04L 12/24* | (2006.01) | |
| *G06F 9/54* | (2006.01) | |
| *G06Q 10/06* | (2012.01) | |
| *H04L 29/08* | (2006.01) | |

(52) U.S. Cl.
CPC ..... *G06Q 10/06313* (2013.01); *H04L 41/145* (2013.01); *H04L 41/147* (2013.01); *H04L 43/0805* (2013.01); *H04L 43/14* (2013.01); *H04L 41/0654* (2013.01); *H04L 43/08* (2013.01); *H04L 67/16* (2013.01)

(58) Field of Classification Search
USPC ........ 709/203, 217, 219, 223, 224; 718/101, 718/104, 105
See application file for complete search history.

(56) References Cited

U.S. PATENT DOCUMENTS

| | | | |
|---|---|---|---|
| 7,904,909 | B1 | 3/2011 | Reiner et al. |
| 8,332,251 | B1 | 12/2012 | Morris et al. |
| 9,378,108 | B2 | 6/2016 | Cohen et al. |
| 2008/0172673 | A1 | 7/2008 | Naik |
| 2009/0055823 | A1* | 2/2009 | Zink .................. G06F 11/3419 718/100 |
| 2009/0199177 | A1 | 8/2009 | Edwards et al. |
| 2011/0307290 | A1 | 12/2011 | Rolia et al. |
| 2012/0102171 | A1 | 4/2012 | Bhatt et al. |
| 2012/0209779 | A1 | 8/2012 | Zhang et al. |
| 2012/0303396 | A1* | 11/2012 | Winkler ................. G06Q 10/00 705/7.11 |
| 2013/0185667 | A1 | 7/2013 | Harper et al. |
| 2013/0205028 | A1 | 8/2013 | Crockett et al. |
| 2013/0263209 | A1 | 10/2013 | Panuganty |
| 2013/0304676 | A1 | 11/2013 | Gupta et al. |
| 2014/0040182 | A1* | 2/2014 | Gilder ............... G06F 17/30578 707/602 |
| 2015/0254161 | A1 | 9/2015 | Baril et al. |
| 2016/0285732 | A1 | 9/2016 | Brech et al. |

OTHER PUBLICATIONS

Appendix P List of IBM Patents or Applications Treated as Related. Dated May 22, 2017. pp. 2.
Original U.S. Appl. No. 15/594,076, filed May 12, 2017.
Cheveresan et al.; "Workload Characterization an Essential Step in Computer Systems Performance Analysis—Methodology and Tools"; Advances in Electrical and Computer Engineering; vol. 9, No. 3, 2009.
Dan et al., "Connecting Client Objectives with Resource Capabilities: An Essential Component for Grid Service Management Infrastructures", Proceedings of the 2nd International Conference on Service Oriented Computing (ICSOC'04), ACM, New York, NY, USA, 2004, pp. 1-8, DOI 10.1145/1035167.1035177.
Goyal et al., "Manageability and Operability in the Business Services Fabric", 2009 18th IEEE International Workshops on Enabling Technologies: Infrastructures for Collaborative Enterprises, © 2009 IEEE, pp. 39-44, DOI 10.1109/WETICE.2209.20.
Han et al. "Network Behavior Analysis Based on a Computer Network Model". East China University of Science and Technology. Aug. 2006. http://citeseerx.ist.psu.edu/viewdoc/download?doi=10.1.1.93.9457&rep=rep1&type=pdf.
Mell et al. "The NIST Definition of Cloud Computing" Recommendations of the National Institute of Standards and Technology. Special Publication 800-145. Sep. 2011. Seven pages. Computer Security Division Information Technology Laboratory National Institute of Standards and Technology Gaithersburg, MD.
Menychtas et al., "A Business Resolution Engine for Cloud Marketplaces", 2011 IEEE Third International Conference on Cloud Computing Technology and Science (CloudCom), Nov. 29-Dec. 1, 2011, pp. 462-469, DOI 10.1109/CloudCom.2011.68.
Ringwald et al.; "Architecture hybride : optimiser la localisation de vos applications ( Fit for Purpose )" UDM 2012 L'Universite du Mainframe et des Systemes Hybrides; 15 et 16 mars—IBM Forum Paris.

* cited by examiner

OUTCOME-BASED SOFTWARE-DEFINED INFRASTRUCTURE

BACKGROUND OF THE INVENTION

The present invention relates generally to the field of software-defined environments (SDE), and more particularly to workload processing in an SDE.

Enterprises are increasingly aggressive in moving mission-critical and performance-sensitive applications to heavily virtualized environments on shared infrastructure and cloud. Mobile, social, and analytics applications are oftentimes directly developed and operated on shared infrastructure and cloud. Current virtualization and cloud solution only allow basic abstraction of the computing, storage, and network resources in terms of their capacity. This approach often calls for standardization of the underlying system architecture to simplify the abstraction of these resources.

Further, the workload-optimized system approach often calls for tight integration of the workload (including compiler) to the underlying system architecture. This approach allows direct leverage of the special capabilities offered by each micro-architecture and by the system level capabilities at the expense of labor intensive optimization required.

A framework, referred to herein as the "Pfister framework," has been used to describe workload characteristics of a given application. The Pfister framework considers "thread contention" versus "data contention." With that in mind, four workload categories are defined: (i) mixed workload updating shared data or queues (such as enterprise software, also known as application and integration middleware); (ii) highly threaded applications; (iii) parallel data structures with analytics (such as frameworks for storage and large-scale processing of data sets on cluster computing environments); and (iv) small discrete applications.

SUMMARY

According to an aspect of the present invention, there is a method for outcome-based adjustment of a software-defined environment (SDE) that includes establishing a link between a business outcome and a first resource configuration from software defined environment, establishing a monitoring mechanism for continuously measuring a current state of the SDE, using a behavior model of the SDE to anticipate, or forecast, a triggering event, and responsive to the forecast of a triggering event, using the behavior model to determine a second resource configuration to achieve the business outcome. The link includes at least one of a utility of services for the business outcome, a cost of a set of resources consumed by the first resource configuration, and a risk of the set of resources becoming unavailable. At least the using the behavior model steps are performed by computer software running on computer hardware.

According to an aspect of the present invention, there is a computer program product for outcome-based adjustment of a software-defined environment (SDE), the computer program product includes a computer readable storage medium having stored thereon program instructions programmed to establish a link between a business outcome and a first resource configuration from a software defined environment, establish a monitoring mechanism for continuously measuring a current state of the SDE, use a behavior model of the SDE to forecast a triggering event, and responsive to a forecast of the triggering event, use the behavior model to determine a second resource configuration to achieve the business outcome. The link includes at least one of a utility of services for the business outcome, a cost of a set of resources consumed by the first resource configuration, and a risk of the set of resources becoming unavailable.

According to an aspect of the present invention, there is a computer system for outcome-based adjustment of a software-defined environment (SDE), the computer system including a processor(s) set, and a computer readable storage medium. The processor set is structured, located, connected, and/or programmed to run program instructions stored on the computer readable storage medium and the program instructions include program instructions programmed to establish a link between a business outcome and a first resource configuration from a software defined environment, establish a monitoring mechanism for continuously measuring a current state of the SDE, use a behavior model of the SDE to forecast a triggering event, and responsive to a forecast of the triggering event, use the behavior model to determine a second resource configuration to achieve the business outcome. The link includes at least one of a utility of services for the business outcome, a cost of a set of resources consumed by the first resource configuration, and a risk of the set of resources becoming unavailable.

DETAILED DESCRIPTION

Figure 1:
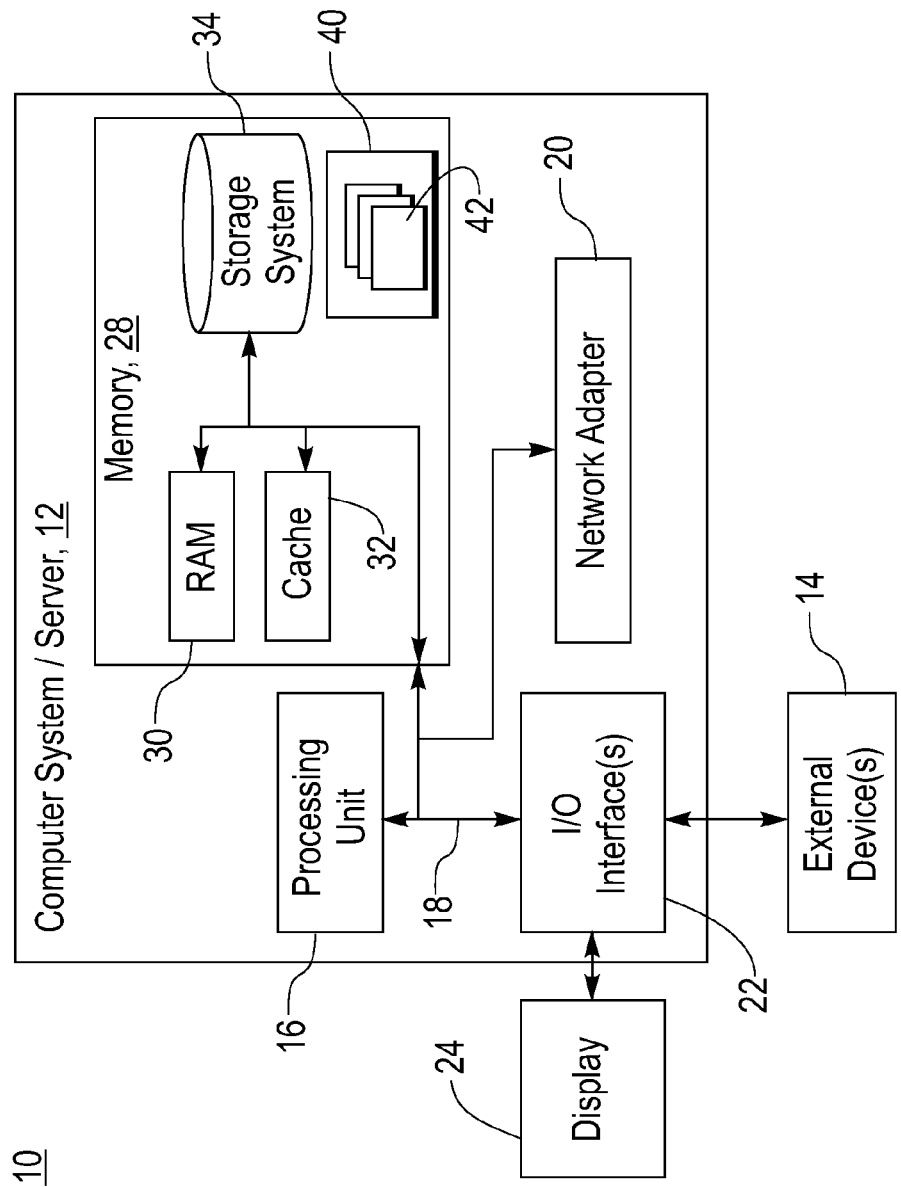
FIG. 1 depicts a cloud computing node used in a first embodiment of a system according to the present invention.

The utility function of a software defined environment (SDE) is continuously adjusted responsive to continuous monitoring of the SDE in terms of value created, minus the cost of resources associated with the value creation, and the cost associated with the risk of failure. The present invention may be a system, a method, and/or a computer program product. The computer program product may include a computer readable storage medium (or media) having computer readable program instructions thereon for causing a processor to carry out aspects of the present invention.

The computer readable storage medium is a tangible device that retains and/or stores instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are, according to some embodiments, downloaded to respective computing/processing devices from a computer readable storage medium or to an external computer or external storage device via a network, for example, the Internet, a local area network, a wide area network and/or a wireless network. The network comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions.

The computer readable program instructions are, according to some embodiments of the present invention, provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions are, according to some embodiments of the present invention, loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, are, in some embodiments, implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that are rapidly provisioned and released with minimal management effort or interaction with a provider of the service. For some embodiments of the present invention, this cloud model includes at least five characteristics, at least three service models, and at least four deployment models.

Characteristics are as follows:

On-demand self-service: a cloud consumer unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities are rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage is monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which includes, in some embodiments, operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It is managed by the organization or a third party and exists either on-premises or off-premises.

Community cloud: the cloud infrastructure is shared by several organizations and supports a specific community that has shared concerns (e.g., mission, security requirements, policy, and compliance considerations). It is managed by the organizations or a third party and exists either on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that are suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules include routines, programs, objects, components, logic, data structures, and so on that perform particular tasks or implement particular abstract data types. Computer system/server 12, according to some embodiments of the present invention, are practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 include computer system readable media in the form of volatile memory, such as random access memory (RAM) 30 and/or cache memory 32. Computer system/server 12 further includes, in some embodiments, other removable/non-removable, volatile/non-volatile computer system storage media. By way of example only, storage system 34 is provided for reading from and writing to a non-removable, non-volatile magnetic media (not shown and typically called a "hard drive"). By further example, and although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media are provided. In such instances, each can be connected to bus 18 by one or more data media interfaces. As will be further depicted and described below, memory 28 includes, in some embodiments, at least one program product having a set (e.g., at least one) of program modules that are configured to carry out the functions of embodiments of the invention.

Program/utility 40, having a set (at least one) of program modules 42, is stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 also, according to some embodiments of the present invention, communicates with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication occurs, in some embodiments, via Input/Output (I/O) interfaces 22. Still yet, computer system/server 12 communicates, in some embodiments, with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
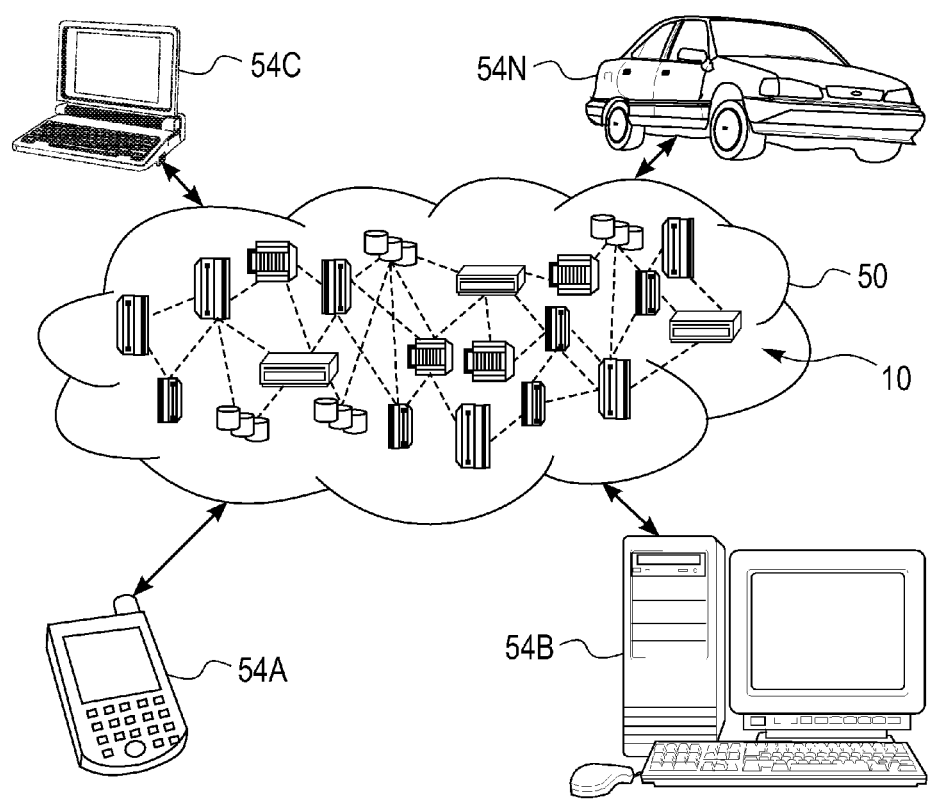
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They are grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 communicate with any type of computerized device over any type of network and/or network addressable connection (e.g., using a web browser).

Figure 3:
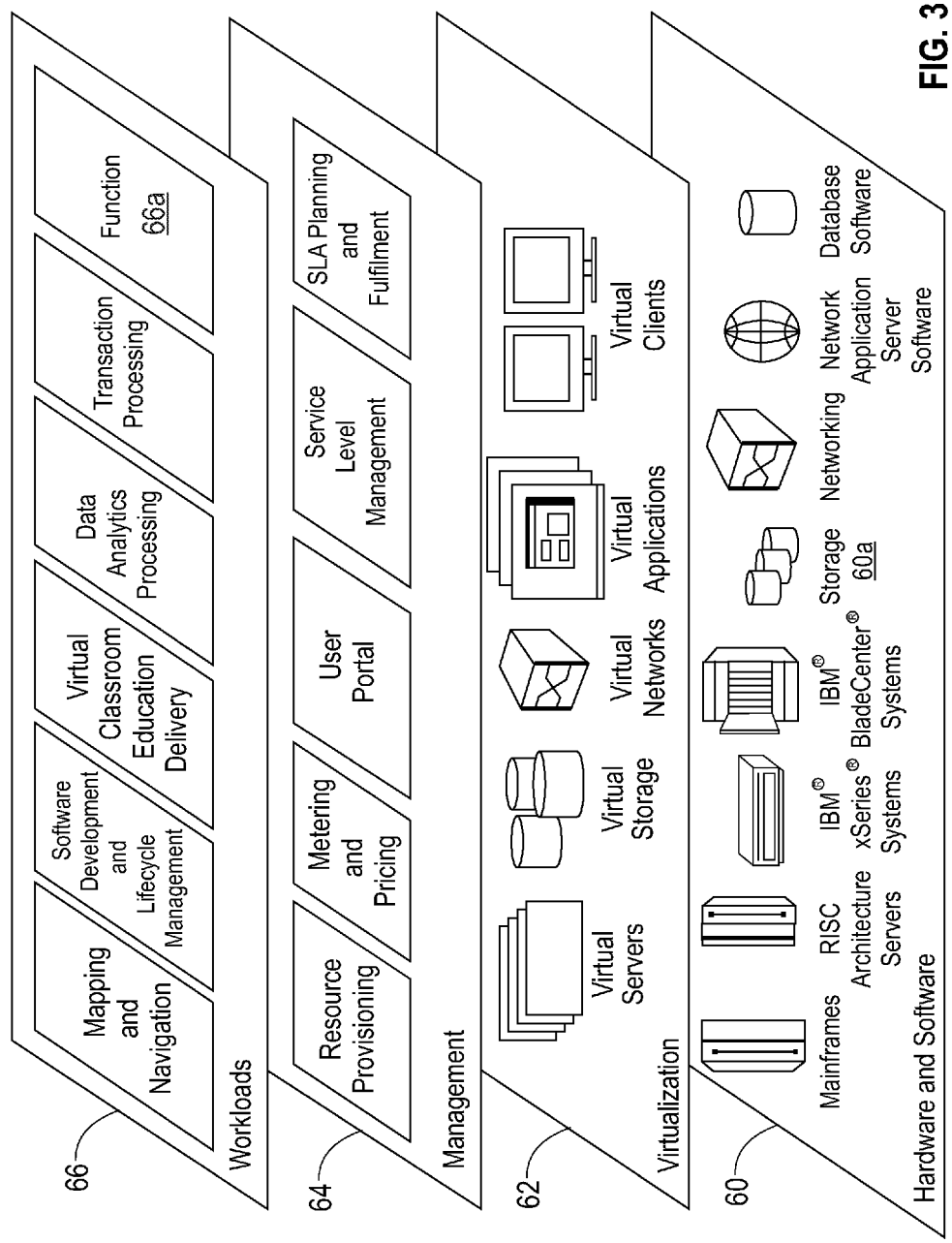
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices 60a; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities are provided: virtual servers; virtual storage; virtual networks, including virtual private networks; virtual applications and operating systems; and virtual clients.

In one example, management layer 64 provides the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment is utilized. Examples of workloads and functions which are provided from this layer include: mapping and navigation; software development and lifecycle management; virtual classroom education delivery; data analytics processing; transaction processing; and functionality, according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 4:
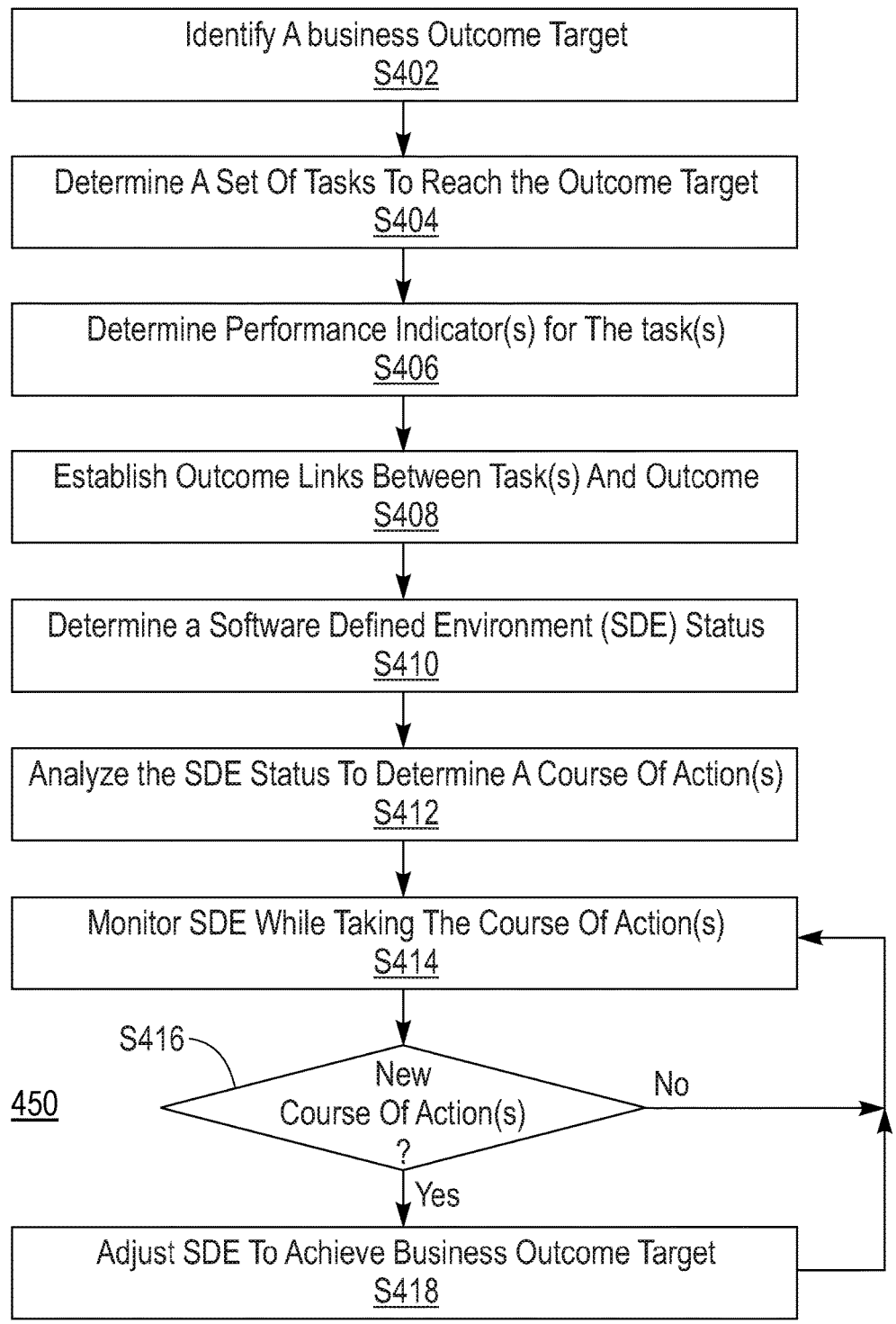
FIG. 4 is a flowchart showing a first embodiment method performed, at least in part, by the first embodiment system.
Figure 5:
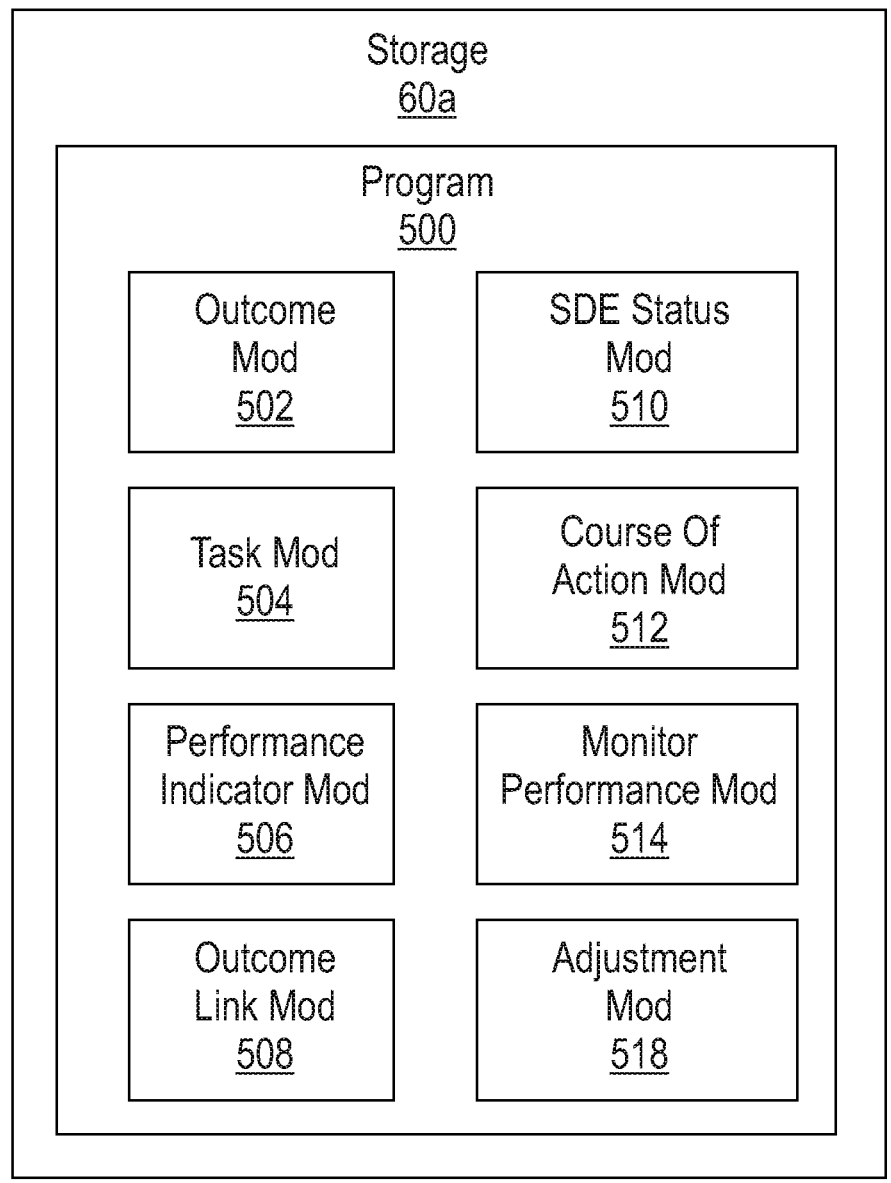
FIG. 5 is a block diagram view of a machine logic (for example, software) portion of the first embodiment system.

FIG. 4 shows flowchart 450 depicting a method according to the present invention. FIG. 5 shows program 500 for performing at least some of the method steps of flowchart 450. This method and associated software will now be discussed, over the course of the following paragraphs, with extensive reference to FIG. 4 (for the method step blocks) and FIG. 5 (for the software blocks). As shown in FIG. 5, one exemplary physical location where program 500 is stored is in storage block 60a (see FIG. 3).

Processing begins at step S402, where outcome module ("mod") 502 identifies a business outcome target. In this example, the business outcome target is one, or more, business operations that are associated with certain requirements and/or expectations of profitability or other successful end.

Processing proceeds to step S404, where task mod 504 determines a set of tasks to reach the outcome target. Oftentimes, multiple tasks are performed to complete the identified business operation, or achieve the business outcome target.

Processing proceeds to step S406, where performance indicator mod 506 determines the set of performance indicator(s) for each task within the set of tasks determined in step S404. The quality or satisfactory completion of a given task that corresponds to a business operation is measured according to the level of performance achieved. Performance indicators and their corresponding satisfactory levels are task specific. That is, each task typically has a set of performance indicator(s) that is unique among other tasks. One example of a performance indicator is a "key performance indicator," or KPI. Examples and further discussion of KPIs are provided in next sub-section of the detailed description.

Processing proceeds to step S408, where outcome link mod 508, establishes outcome links between the task(s) of a given business operation and the business outcome target. The outcome links operate to prioritize the various tasks associated with the business operation. In that way, the higher priority task may be favored for achieving a particular performance level over a lower priority task. This provides for trade-off decisions to be made in the steps that follow for optimizing the business outcome and continuously maintaining a target outcome.

Processing proceeds to step S410, where SDE (software defined environment) status mod 510 determines an SDE status. The term status refers to the performance level of the SDE for achieving the business outcome. The SDE status, as discussed in more detail below, includes: (i) the value to the business if the services are completed; (ii) the cost of the resource provisioning; (iii) the cost of a resource as the cost evolves during execution of the service(s); and/or (iv) the cost of potential failure (e.g. operational risk).

Processing proceeds to step S412, where course of action mod 512 analyzes the SDE status to determine a course of action(s). The actions that may be taken are discussed in more detail below in the sub-section that follows. These actions are designed to improve the overall utility function of the system, whether at the user's utility function or the resource cost function. Course of action decisions are facilitated by the SDE where the abstracted compute, storage, and network allow for a unified switch fabric for agile system optimization.

Processing proceeds to step S414, where monitor performance mod 514 monitors the SDE status while taking the course of action(s) determined in step S412. Monitoring acts to identify triggers, discussed below, for taking a new course of action. Triggers include: (i) a request by the service; (ii) a request by the workload; (iii) deviation of the observed performance indicators of the business operation from the specified tolerance(s); and/or (iv) the occurrence of potential catastrophic events. In summary, this monitoring step acts to monitor the value creation and cost of resource usage and the cost associated with the risk.

Processing proceeds to decision step S416, where monitor performance mod 514 determines whether to adjust the SDE to better achieve the desired business outcome. The decision step provides for continuous optimization of the utility function of the SDE in terms of value created, minus the cost of resources associated with the value creation, as well as the cost associated with the risk of failure. So long as a new course of action is not needed, or otherwise undesirable, processing follows the "no" branch, returning to step S414. When a new course of action is needed, processing follows the "yes" branch to step S418.

Following the "yes" branch, processing proceeds to step S418, where adjustment module 518 adjusts the SDE to achieve the business outcome target. In this example, the adjustment module adjusts the resource configuration so that the projected utility is continuously maximized. Alternatively, the adjustment module adjusts, as permitted, any of the various aspects of the overall utility function to optimize the business outcome. As shown in the illustration, upon adjustment in step S418, processing returns to step S414, where the SDE is further monitored. Alternatively, processing ends at step S418, having made a single adjustment to reach a business outcome target.

Some embodiments of the present invention recognize the following facts, potential problems, and/or potential areas for improvement with respect to the current state of the art: (i) there is a shift of the value proposition of cloud computing from that of cost reduction to simultaneous agility and optimization; (ii) oftentimes, the IaaS (infrastructure as a service) providers need to know, from the users, the exact amount of resources needed before provisioning those resource, in that way, they can only do a limited amount of scaling, which is conventionally based on the load instead of business need; (iii) conventionally, it is entirely up to the user to conduct the tradeoff determination among different infrastructure resource requirements in order to achieve the desired business outcome; and/or (iv) the business requirements of agility and optimization are drivers of software defined computing, where the entire computing infrastructure including compute, storage, and network are both: (a) software defined, and (b) dynamically programmable.

Software defined computing originated from the compute environment where the computing resources are virtualized and managed as virtual machines. The software defined network moves the network control plane away from the switch to the software running on a server for improved programmability, efficiency, and extensibility. Software defined storage, similar to software defined network, separates the control plane from the data plane of a storage and dynamically leverages heterogeneity of storage to respond to changing workload demands. Software defined environment (SDE) brings together software defined compute, network, and storage, unifying the control planes from each individual software defined component. Unified control planes allow for rich resource abstractions to enable assembling purpose fit systems and/or providing programmable infrastructures to enable dynamic optimization in response to business requirements.

Some embodiments of the present invention provide for achieving optimality of a SDE to offer flexibility and re-configurability without sacrificing agility. Some embodiments of the present invention provide for dynamically adjusting the overall SDE in response to a shifting of workloads between process-centric and data-centric workloads. Also, some embodiments of the present invention ensure the effectiveness of the overall SDE, as it relates to a given target business outcome.

Some embodiments of the present invention perform one, or more of the following steps: (i) establish the linkage between the business outcome and the required support from the SDE, including: (a) the utility of the services for the business, (b) the cost of resources consumed, and (c) the risk if the resources become unavailable due to data center outage, cyber-attacks, and/or cascading failures; (ii) capture the range of feasible tradeoff among different criteria in order to achieve the required "outcome" from the SDE; (iii) establish the monitoring mechanisms for continuously measuring the current state of the SDE; (iv) use the behavior models for the SDE (that includes for the workload, the system, and the users) to anticipate, or forecast, the near future event, and, further, to conduct "what-if" analysis for selecting the best courses of action going forward; and/or (v) continuously optimize the configuration of the computing environment including: (a) optimal tiering of the data and compute infrastructure, (b) placement of the processing infrastructure, and/or (c) automatic scaling and/or migrating of the compute, storage, and network resources.

Figure 6:
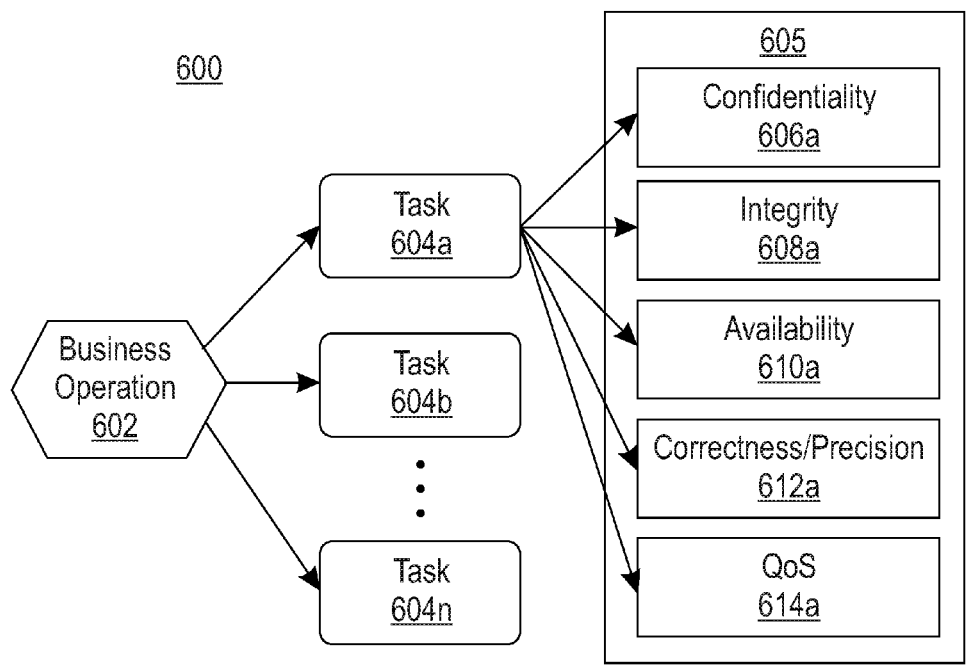
FIG. 6 is a flowchart view of a second embodiment of a method according to the present invention.

FIG. 6 illustrates process flow 600, where business operation 602 is decomposed into multiple tasks 604a, 604b through 604n. Each task includes respectively corresponding key performance indicators (KPIs), such as KPI set 605 for task 604a. KPI set 605 includes the following KPIs: confidentiality 606a, integrity 608a, availability 610a, correctness (or precision) 612a, and quality of service (QOS) 614a (examples of QoS are latency and throughput). Note that the KPIs identified in KPI set 605 are only an example selection of KPIs that may be identified as known by those skilled in the art. In this example, each of the KPIs for each of the tasks is assigned a priority value.

The following use case is provided to clarify the operation of some embodiments of the present invention. An e-commerce business operation includes the tasks: (i) marketing (ad display); (ii) search against the catalog; (iii) verification of inventory; (iv) invoicing and billing; and (v) fulfillment. Each of these tasks are measured by a different set of KPIs. That is, marketing may focus on the KPI availability, search-against-the-catalog may focus on the KPIs latency and precision, and verification-of-inventory may focus on the KPI integrity.

Some embodiments of the present invention provide for each task to access data, both streamed and persisted, even when the persisted data is be located "outside" of the SDE. For persisted data located outside of the SDE, the data is modeled as data node(s) at the edge of the SDE.

An objective for outcome-based optimization of business operations is to ensure optimal business operation during both normal operation (to get the most out of available resource) and abnormal operation (to ensure the business operation continues despite actual or potential system outages). This objective sets up the potential requirement of tradeoffs among various KPIs in order to ensure the overall business performance does not fail due to system outages. Continuing with the above example, it will be appreciated that tradeoff decisions are available as-needed when: (i) decomposing the business operation into tasks; (ii) prioritizing each task; and/or (iii) assigning KPIs for each of task. Using the task, "search against catalog" as an example, the value of the KPI "precision" may be reduced when there is an insufficient capacity until either the capacity is increased or the workload is reduced.

Figure 7:
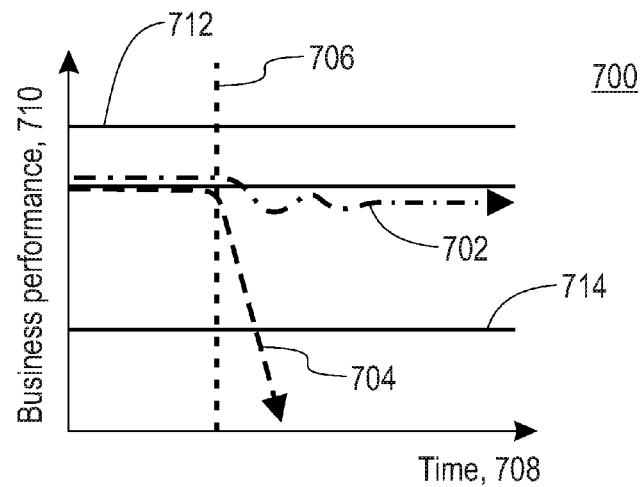
FIG. 7 is a graph view showing information that is generated by and/or helpful in understanding embodiments of the present invention.

FIG. 7 illustrates in chart 700 how continuous optimizations, identified as resilient computing 702, with respect to business objectives, performs versus conventional system 704, when faced with a potential setback due to catastrophic event 706, such as a computer crash or cyber attack. In the chart, time 708 is on the x-axis and business performance 710 is on the y-axis. Also illustrated are lines depicting theoretical optimum 712 and critical functionality 714 levels of business performance. The outcome of the business operation may be determined according to, for example: (i) the priority of a certain task ($P_i$); (ii) the relative importance of a specific KPI of the task ($Wi_{ij}$) (importance of property "j" to task "I"); and/or (iii) the level of achievement with respect to that specific key performance indicator ($V_{ij}$) (degree to which property "j" is achieved for task "i."). In this example, each of the identified outcome determinant factors is presented in the following formula:

$$\text{Business Performance} = \Sigma P_i \Sigma W_{ij} V_{ij}$$

Some embodiments of the present invention associate outcome-based optimization with establishing a "utility function" of the target business operation. The utility function may take into account: (i) the value to the business if the services are completed as described above; (ii) the cost of the resource provisioning (including usage of compute, storage, and network resources, as well as the software licensing cost, if any); (iii) the cost of a resource could evolve during execution of the services (this could be due to the type of resource(s) requirement change and/or the place for best executing a process change); and/or (iv) the cost of potential failure due to system outage, data center outage, cascading failures, cyber attacks, and so forth (this is often referred to as operational risk).

An outcome-optimized view of resource provisioning includes both process-centric and data-centric views of overall business operations. The resources for storing data may be known (in terms of where). Provisioning the remaining resources may be determined according to whether it is more cost effective to move processing (e.g. migrate the virtual images) to a location close to the data storage, or to move the data to a location close to where processing capabilities, such as advanced processing, reside. Consideration should include network bandwidth availability. The problem of planning, placement, and provisioning may be compared to the problem of scheduling an airline crew, where there is a need to either migrate the crew (i.e. data) or the airplane (i.e. virtual images) for an optimal outcome. The duality between the process, the images, and the data also allows for the introduction of local caching of images and/or data (similar to the content delivery network concept) to maximize the effective throughput and minimize potential latency.

Some embodiments of the present invention translate the KPIs for a given task to KPIs for the architecture and/or the infrastructure. In one embodiment, the translation is as follows: (i) confidentiality translates to required isolation for the infrastructure; (ii) availability translates into redundant instantiation of the run time for each task (active-active, active-passive, or based on implementation similar to Google File System (GFS) or Apache zookeeper); (iii) transaction, data, process, and policy integrity are each managed at the application level, while the integrity of the executables (and virtual machine images) is managed at the infrastructure level; (iv) correctness and/or precision are managed at the application level; and (v) QoS translates directly to the implications for infrastructures. (Note: the term(s) "Google," "GPS," and/or "Apache" may be subject to trademark rights in various jurisdictions throughout the world and are used here only in reference to the products or services properly denominated by the marks to the extent that such trademark rights may exist.)

Figure 8:
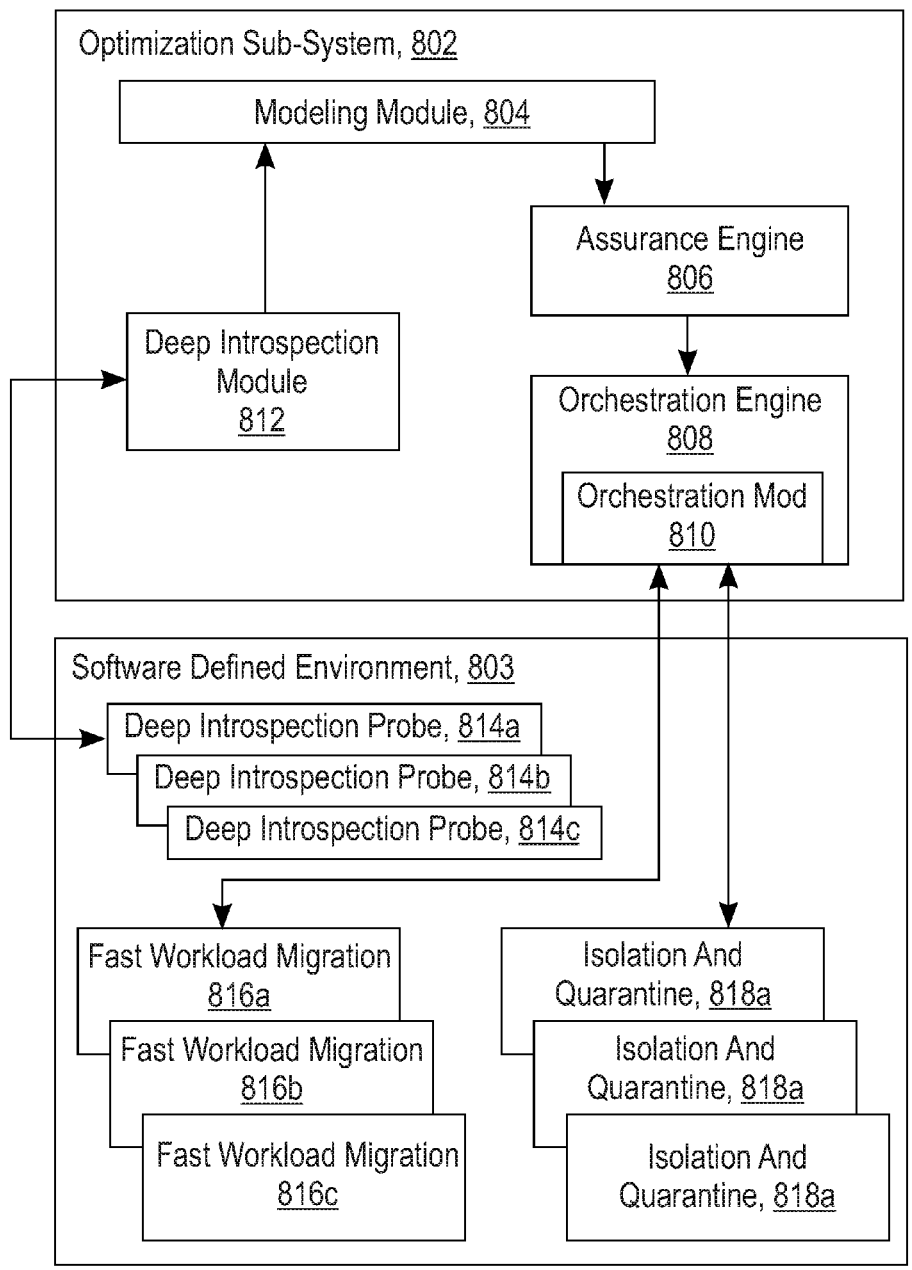
FIG. 8 is a system view of second embodiment of a system according to the present invention.
Figure 9:
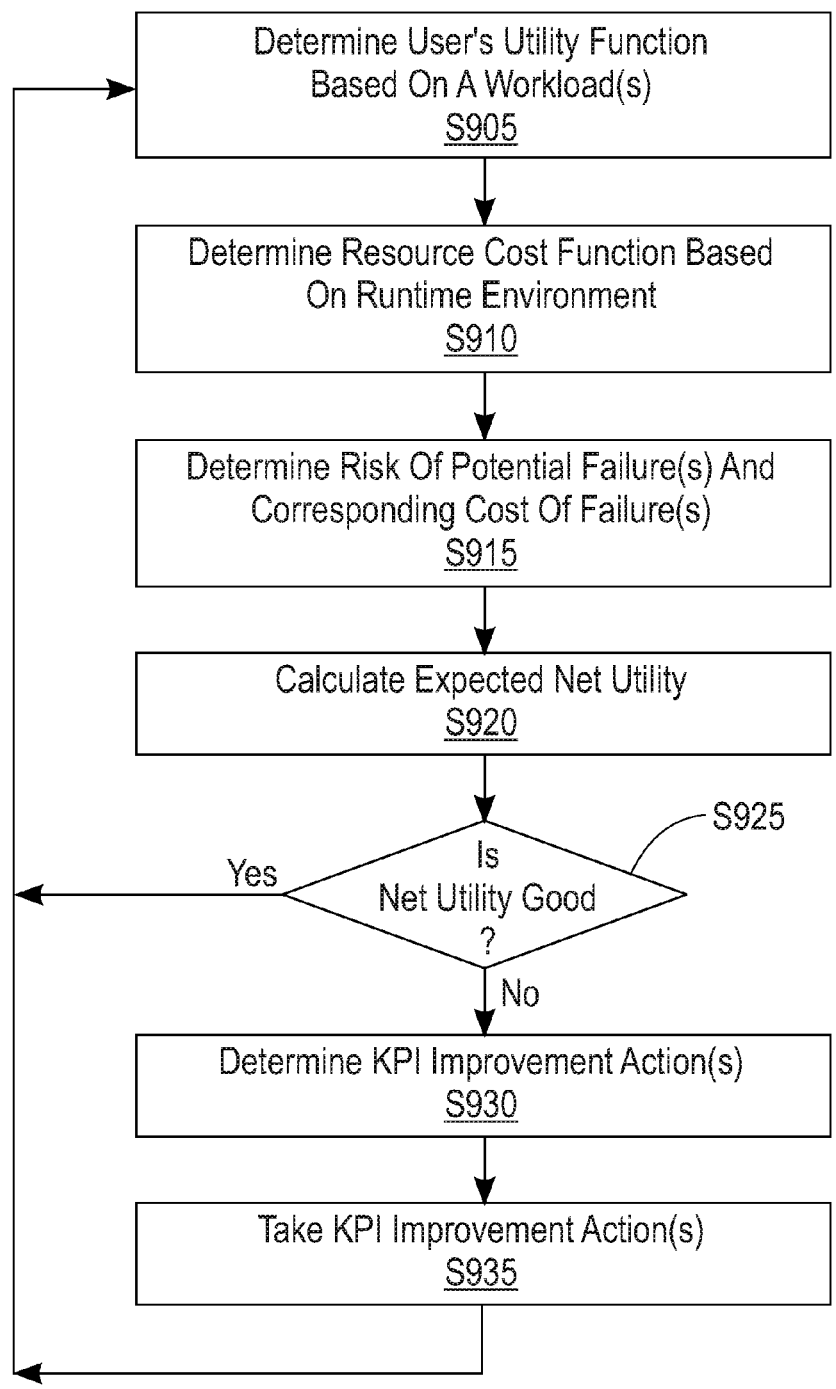
FIG. 9 is a flowchart view of a third embodiment of a method performed, at least in part, by the second embodiment system.

FIG. 8 is a block diagram of system 800 for ensuring the effectiveness of an overall SDE with respect to target business outcomes. The system is shown as a closed-loop framework including: optimization sub-system 802; SDE 803; modeling module 804; assurance engine 806; orchestration engine 808; service orchestration module 810; deep introspection module 812; deep introspection probes 814*a*, 814*b*, 814*c*; fast workload migration applications 816*a*, 816*b*, 816*c*; and fine-grained isolation and quarantine applications 818*a*, 818*b*, 818*c*. FIG. 9 shows flowchart 900 depicting a method performed, at least in part, by system 800. This method and associated system will now be discussed, over the course of the following paragraphs.

The KPIs of a specified service are continuously monitored and evaluated at each layer (the application layer and the infrastructure layer), so that the overall utility function (value of the business operation, cost of resource, and risk to potential failures) may be continuously evaluated. Processing begins at step S905, where modeling module 804 determines the user's utility function based on one or more of: a current workload, and a scalable service ecosystem API (application program interface). Deep introspection probes 814*a*, 814*b*, 814*c* within each layer, managed by deep introspection module 812, are used to facilitate both the initial determination and subsequent monitoring activity (see step S925).

Processing proceeds to step S910, where modeling module 804 determines the resource cost function based on the current runtime environment, where the workload(s) and/or service(s) are implemented. The resources used by each method have a particular cost. The resource cost function takes into account the resources required by each method performed in the runtime environment. The cost is a function of the particular SDE IaaS abstraction of compute, storage, and/or network. The abstraction may include: (i) server virtualization; (ii) storage virtualization; and/or (iii) switch fabric virtualization (network). In this example, a unified switch fabric for both server and storage enable assembling purpose fit systems and/or programmable infrastructures for dynamic optimization of the SDE in response to business requirements. Step S910 is also facilitated by deep introspection module 812, as discussed above.

Processing proceeds to step S915, where modeling module 804 determines the risk of potential failure(s) and the corresponding cost(s) of failure(s). The risk considered in this step includes the operational risk associated with resources becoming unavailable due to data center outage, cyber-attacks, and/or cascading failures. Operation risk is defined as the risk of a change in value caused by the fact that actual losses, incurred for inadequate or failed internal processes, people and systems, or from external events (including legal risk), differ from the expected losses. This definition from the Basel II regulations was also adopted by the European Union Solvency II Directive. It can also include other classes of risk, such as fraud, security, privacy protection, legal risks, physical (e.g. infrastructure shutdown) or environmental risks. Specifically, the focus here is on the risk of business disruption and systems failures, which includes utility disruptions, software failures, hardware failures, and/or datacenter outages. The risk of potential system failure is determined by the probability of system failure, and the redundancy of the application, system software, and systems themselves. The overall approach is to have sufficient redundant resources to minimize loss of availability while utilizing minimal amount of resources. To summarize, in the above-mentioned steps, S905, S910, and S915, data identified during monitoring and initial baseline determination is fed into behavior models of modeling module 804 for the SDE (that includes the workload, the data (usage patterns), the infrastructure, and the people and processes).

Processing proceeds to step S920, where the modeling module 804, calculates the expected net utility, or overall utility function, of the system. The expected net utility is computed by taking the value proposition of completed service, or successful service, and subtracts the resource cost, determined in step S910. Further, an adjustment is made to the net utility based on the risk of failure, determined in step 915.

Processing proceeds to decision step S925, where modeling module 804 decides whether the net utility as calculated in step S920 is acceptable, or good. Occasionally, triggering events occur that cause performance levels to drop. In this decision step, such triggering events will be recognized by a reduced net utility. If the net utility is acceptable, processing follows the "yes" branch, returning to step S905. If the net utility is not acceptable, processing proceeds to step S930, where adjustments are considered for improving the net utility level.

Triggering events include, for example: (i) explicit request by the service; (ii) explicit request by the workload; (iii) deviation of the observed KPIs of the business operation from the specified tolerance(s) (e.g. according to a service level agreement); and (iv) proactive determination of potential catastrophic events (e.g. data center outage, cascading failure, and cyber attacks). The determination cited in (iv) may be based on the continuous behavior models generated by modeling module 804 for users, workloads, and/or systems.

Following the "no" branch, processing proceeds to step S930, where assurance engine 806 applies a decision model to determine a next configuration or otherwise determine a change, or changes, to improve the net utility level. In this example, the assurance engine processes what-if scenarios. What-if scenarios consider, for example, deployment of different amounts of resources against each task. The what-if scenarios are evaluated, or re-evaluated, to determine whether performance according to the KPIs can be potentially improved. Improvement actions may include: (i) scaling up of the resources for each task; (ii) scaling down of the resources for each task; (iii) migrating the task; and/or (iv) re-building the task. The what-if scenario is based on the behavior models that are fit with the data collected by the monitoring and deep introspection mechanisms.

Processing proceeds to step S935, where orchestration engine 808, initiates the KPI improvement actions determined in step S930. When the scenario that maximizes the overall utility function is selected by assurance engine 806, orchestration engine 808 orchestrates the SDE for: (i) adjusting resource provisioning (e.g. scale up or scale down); (ii) establishing a quarantine of the resources (e.g. in various resiliency and/or security scenarios); (iii) migrate task and/or workload; and/or (iv) performing server rejuvenation.

Processing may end at step S935, but continuous system improvement is available when processing returns to step S905, where the improvement action drives changes in one or more of: (i) the user's utility function; (ii) the resource cost function; and (iii) the risk of potential failures.

Some embodiments of the present invention may include one, or more, of the following features, characteristics and/or advantages: (i) provides a framework for a cloud service provider who is providing services for multiple enterprises where each enterprise may utilize multiple cloud service providers to handle their workloads (consequently, there will be two separate perspectives, one for each enterprise and one for each cloud service provider, to be optimized concurrently, though separately; (ii) uses an outcome-optimized framework to ensure preferred performance standards from the perspectives of both the enterprise and the cloud service provider; (iii) provides a holistic framework of continuously optimizing the outcome of the overall mapping of business services to the available virtualized heterogeneous resources while taking into account the cost of resources, cost of failure, and the business value delivered by each of the services; (iv) includes modeling and prediction of the workload behavior from each and every service performed in the computing environment, in order to perform continuous outcome optimization that includes the predicted cost of resources, predicted cost of failure, and predicted value generated by executing each and every service; (v) provides a framework that is a combination of workload specification (and abstraction) and both passive and active monitoring of the workloads in order to provide a more accurate prediction of the workloads in order to forecast a future condition; and/or (vi) continuously and dynamically provisions resources for all of the services executed in the environment, so that the utility (or outcome) of the overall environment is optimized based on the projected workload behavior.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for outcome-based adjustment of a software-defined environment (SDE), the method comprising:
    dividing a business operation into a set of prioritized tasks including high priority tasks and low priority tasks, each task having a corresponding set of key performance indicators (KPIs);
    establishing a set of outcome links between the set of prioritized tasks and a first resource configuration for the SDE, the set of outcome links favoring the high priority tasks over the low priority tasks with respect to the first resource configuration;

establishing a monitoring mechanism for continuously measuring a current state of the SDE while performing each of the prioritized tasks;

predicting a triggering event based on a first outcome of a behavior model of the SDE;

responsive to predicting the triggering event, determining to change from the first resource configuration to a second resource configuration for the SDE according to the set of outcome links for performing the business operation based on a second outcome of the behavior model;

wherein:

the set of outcome links include at least one of a utility of services for the business operation, a cost of a set of resources consumed by the first resource configuration, and a risk of the set of resources becoming unavailable; and at least the using the behavior model steps are performed by computer software running on computer hardware.

2. The method of claim 1, further comprising:

capturing a range of tradeoffs for achieving the business outcome from the SDE;

wherein:

the range of tradeoffs make up a set of resource configurations.

3. The method of claim 2, wherein a tradeoff within the range of tradeoffs includes one of tiering of data storage, tiering of compute resources, placement of processing resources, scaling of compute resources, scaling of storage resources, scaling of network resources, migrating compute resources, migrating storage resources, and migrating network resources.

4. The method of claim 1, wherein the second resource configuration is determined, at least in part, by the behavior model indicating an improved performance level of a KPI of a high priority task when compared to the corresponding performance level in the first resource configuration.

5. The method of claim 1, wherein infrastructure is provided as a service in a cloud environment.

6. The method of claim 1, wherein the triggering event is one of: (i) request by a service; (ii) request by a workload; (iii) deviation of an observed performance indicator of a business operation; and (iv) a potentially catastrophic event.

7. The method of claim 1, further comprising:

assigning a priority value to each KPI of the corresponding set of KPIs.

8. The method of claim 1, wherein each task of the set of prioritized tasks is measured by a different set of KPIs.

9. A computer program product for outcome-based adjustment of a software-defined environment (SDE), the computer program product comprising a computer readable storage medium having stored thereon program instructions programmed to:

divide a business operation into a set of prioritized tasks including high priority tasks and low priority tasks, each task having a corresponding set of key performance indicators (KPIs);

establish a set of outcome links between the set of prioritized tasks and a first resource configuration for the SDE, the set of outcome links favoring the high priority tasks over the low priority tasks with respect to the first resource configuration;

establish a monitoring mechanism for continuously measuring a current state of the SDE while performing each of the prioritized tasks;

predict a triggering event based on a first outcome of a behavior model of the SDE; and responsive to predicting the triggering event, determining to change from the first resource configuration to a second resource configuration for the SDE according to the set of outcome links for performing the business operation based on a second outcome of the behavior model;

wherein:

the set of outcome links include at least one of a utility of services for the business operation, a cost of a set of resources consumed by the first resource configuration, and a risk of the set of resources becoming unavailable.

10. The computer program product of claim 9, further comprising:

program instructions programmed to capture a range of tradeoffs for achieving the business outcome from the SDE;

wherein:

the range of tradeoffs make up a set of resource configurations.

11. The computer program product of claim 10, wherein a tradeoff within the range of tradeoffs includes one of tiering of data storage, tiering of compute resources, placement of processing resources, scaling of compute resources, scaling of storage resources, scaling of network resources, migrating compute resources, migrating storage resources, and migrating network resources.

12. The computer program product of claim 10, wherein the second resource configuration is determined, at least in part, by the behavior model indicating an improved performance level of a KPI of a high priority task when compared to the corresponding performance level in the first resource configuration.

13. The computer program product of claim 10, wherein infrastructure is provided as a service in a cloud environment.

14. The computer program produce of claim 10, wherein the triggering event is one of: (i) request by a service; (ii) request by a workload; (iii) deviation of an observed performance indicator of a business operation; and (iv) a potentially catastrophic event.

15. A computer system for outcome-based adjustment of a software-defined environment (SDE), the computer system comprising:

a processor(s) set; and a computer readable storage medium;

wherein:

the processor set is structured, located, connected, and/or programmed to run program instructions stored on the computer readable storage medium; and the program instructions include program instructions programmed to:

divide a business operation into a set of prioritized tasks including high priority tasks and low priority tasks, each task having a corresponding set of key performance indicators (KPIs);

establish a set of outcome links between the set of prioritized tasks and a first resource configuration for the SDE, the set of outcome links favoring the high priority tasks over the low priority tasks with respect to the first resource configuration;

establish a monitoring mechanism for continuously measuring a current state of the SDE while performing each of the prioritized tasks;

predict a triggering event based on a first outcome of a behavior model of the SDE; and responsive to predicting the triggering event, determining to change from the first resource configuration to a second resource configuration for the SDE according to the set of outcome links for performing the business operation based on a second outcome of the behavior model;

wherein:

the set of outcome links include at least one of a utility of services for the business operation, a cost of a set of resources consumed by the first resource configuration, and a risk of the set of resources becoming unavailable.

16. The computer system of claim 15, further comprising:
program instructions programmed to capture a range of tradeoffs for achieving the business outcome from the SDE;

wherein:

the range of tradeoffs make up a set of resource configurations.

17. The computer system of claim 16, wherein a tradeoff within the range of tradeoffs includes one of tiering of data storage, tiering of compute resources, placement of processing resources, scaling of compute resources, scaling of storage resources, scaling of network resources, migrating compute resources, migrating storage resources, and migrating network resources.

18. The computer system of claim 16, wherein the second resource configuration is determined, at least in part, by the behavior model indicating an improved performance level of a KPI of a high priority task when compared to the corresponding performance level in the first resource configuration.

19. The computer system of claim 16, wherein infrastructure is provided as a service in a cloud environment.

* * * * *